Patented Feb. 14, 1933

1,897,798

UNITED STATES PATENT OFFICE

FRIEDRICH WILHELM GUTHKE, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

DESULPHURIZATION OF CRUDE AROMATIC HYDROCARBONS

No Drawing. Application filed May 28, 1928, Serial No. 281,365, and in Germany June 24, 1927.
Renewed May 24, 1932.

I have found that crude aromatic hydrocarbons can be freed from sulphur bearing impurities in a particularly advantageous manner by treating them, in the form of vapor or in the liquid state, with hydrogen or gases containing the same, at elevated temperatures and at atmospheric or elevated pressure, in the presence of metallic sulphides which are stable under the working conditions employed, the pressure applied at the temperature employed being below that required for a hydrogenation of the aromatic hydrocarbons under treatment. The metallic sulphides may be used singly or in admixture with one another or with other substances, particularly activators, such as compounds of metals of the 4th to 8th group of the periodic system and especially their oxides and, if desired, deposited on carriers.

According to this manner of working, the desulphurization may be carried to such an extent that the purified substances can be easily employed in other catalytic processes, such as catalytic hydrogenation, a poisoning of the catalysts in these processes being avoided. During the treatment, the sulphur is converted into sulphuretted hydrogen or other readily separable compounds. The temperatures to be employed depend, generally speaking, on the state of combination of the sulphur, i. e. the more firmly the sulphur is bound in the organic substances the higher temperatures are to be used. In the case of benzene and its nearest homologues for example, temperatures ranging from 200 to 300 degrees centigrade are suitably employed.

Suitable carriers for the metallic sulphides are, for example, pumice, active charcoal and the like.

The following examples will further illustrate the nature of the said invention which however is not limited thereto.

Example 1

Molybdenum sulphide is preceipitated in the presence of powdered active charcoal, the resulting mixture being washed and dried. If a crude naphthalene fraction be heated with 10 per cent of its weight of the above catalyst at 300° centigrade, at a pressure of from 50 to 100 atmospheres of hydrogen, in an autoclave, a product free from sulphur is obtained. This product can directly be hydrogenated in a continuous process, with a nickel catalyst.

Example 2

Benzol is heated to 250° centigrade, at a pressure of 50 atmospheres of hydrogen, with a catalyst consisting of nickel sulphide, precipitated in the presence of powdered active charcoal. A benzol is obtained, which is quite free from thiophene and other sulphur compounds and can be completely hydrogenated into cyclohexane with a nickel catalyst in the usual manner without difficulties.

Example 3

Benzol is vaporized in a current of hydrogen and passed over a catalyst heated to 250° centigrade and consisting of nickel sulphide and chromic oxide which have been deposited, in the proportion of 10:1, on granulated charcoal, activated with phosphoric acid. The reaction mixture issuing from the reaction chamber is passed over a layer of burnt lime heated to about 100° centigrade, in order to bind the sulphuretted hydrogen formed, and then over an ordinary nickel catalyst heated to from 180 to 190 centigrade. In this way, pure cyclohexane, practically free from unaltered benzol, is obtained.

Example 4

If a catalyst comprising molybdenum sulphide and cobalt oxide in about the proportions of their molecular weight, be employed for the desulphuration of benzol even of a very high content of sulphur in the aforedescribed manner the hydrogen acts even at ordinary pressure. When starting with a hydrogen pressure of about 15 atmospheres only and working at about from 250 to 300 degrees centigrade, the efficiency of the catalyst for desulphuration will not diminish for a very long time.

Example 5

Vapors of benzol which contain ½ per cent of sulphur in the form of sulphur-containing organic compounds, are mixed with the quantity of hydrogen sufficient for both the desulphuration and the following hydrogenation and passed at 300° centigrade and a pressure of 60 atmospheres over a catalyst prepared in accordance with the foregoing example. This manner of working allows of desulphurizing per hour 50 times the weight of the catalyst of benzene. The gases effluing from the reaction chamber are released in pressure to 10 atmospheres and passed through a washing vessel which is filled with an aqueous solution of about 60 per cent sodium hydroxid and heated to from 100 to 120 degrees centigrade. Without further releasing the pressure the gases and vapors which are now free from hydrogen sulphide and sulphur-containing organic compounds are passed over a catalyst for the hydrogenation of benzol. Instead of mixing the initial material with all of the hydrogen needed for both the desulphuration and hydrogenation, only ⅓ or ¼ molecular proportion of hydrogen for each molecular proportion of benzol may be used for the desulphuration only, adding the quantities required for the hydrogenation only after the desulphuration.

What I claim is:—

1. The process of purifying crude aromatic hydrocarbons from sulphur-bearing impurities, which comprises treating the same with hydrogen in the presence of metallic sulphids at a temperature between about 100 and 300° C., the pressure applied being below that required for a hydrogenation of the said hydrocarbons at the temperatures stated.

2. The process of purifying crude aromatic hydrocarbons from sulphur-bearing impurities, which comprises treating the same in the vaporous state with hydrogen in the presence of metallic sulphids at a temperature between about 100 and 300° C., the pressure applied being below that required for a hydrogenation of the said hydrocarbons at the temperatures stated.

3. The process of purifying crude aromatic hydrocarbons from sulphur-bearing impurities, which comprises treating the same with gases containing hydrogen in the presence of metallic sulphids at a temperature between about 100 and 300° C., the pressure applied being below that required for a hydrogenation of the said hydrocarbons at the temperatures stated.

4. The process of purifying crude aromatic hydrocarbons from sulphur-bearing impurities, which comprises treating the same at a pressure above atmospheric pressure with hydrogen in the pressure of metallic sulphids at a temperature between about 100 and 300° C., the pressure applied being below that required for a hydrogenation of the said hydrocarbons at the temperatures stated.

5. The process of purifying crude aromatic hydrocarbons from sulphur-bearing impurities, which comprises treating the same with an amount of hydrogen in excess of that required for the transformation of organic sulphur compounds into hydrogen sulphid in the presence of metallic sulphids at a temperature between about 100 and 300° C., the pressure applied being below that required for a hydrogenation of the said hydrocarbons at the temperatures stated.

6. The process of purifying crude aromatic hydrocarbons from sulphur-bearing impurities, which comprises treating the same with hydrogen in the presence of metallic sulphides at a temperature between 200° and 300° C., the pressure being below that required for a hydrogenation of the said hydrocarbons at the temperatures stated.

7. The process of purifying crude aromatic hydrocarbons from sulphur-bearing impurities, which comprises treating the same with hydrogen in the presence of a metallic sulphide and of an activator comprising an oxide of a metal of the 4th to 8th group of the periodic system at a temperature between 100° and 300° C., the pressure applied being below that required for a hydrogenation of the said hydrocarbons at the temperatures stated.

8. The process of purifying crude aromatic hydrocarbons from sulphur-bearing impurities, which comprises treating the same with hydrogen in the presence of a metallic sulphide and of an activator comprising chromic oxide at a temperature between 100° and 300° C., the pressure applied being below that required for a hydrogenation of the said hydrocarbons at the temperatures stated.

9. The process of purifying crude aromatic hydrocarbons from sulphur-bearing impurities, which comprises treating the same with hydrogen in the presence of nickel sulphide at a temperature between 200° and 300° C., the pressure applied being below that required for a hydrogenation of the said hydrocarbons at the temperatures stated.

10. The process of purifying crude aromatic hydrocarbons from sulphur-bearing impurities, which comprises treating the same in the presence of nickel sulphide and chromic oxide at a temperature between 200° and 300° C., the pressure applied being below that required for a hydrogenation of the said hydrocarbons at the temperatures stated.

11. The process of purifying crude aromatic hydrocarbons from sulphur-bearing impurities, which comprises treating the same in the presence of molybdenum sulphide at a temperature between 200° and 300° C., the pressure applied being below that required for a hydrogenation of the said hydrocarbons at the temperatures stated.

12. The process of purifying crude aromatic hydrocarbons from sulphur-bearing impurities, which comprises treating the same in the presence of molybdenum sulphide and cobalt oxide at a temperature between 200° and 300° C., the pressure applied being below that required for a hydrogenation of the said hydrocarbons at the temperatures stated.

In testimony whereof I have hereunto set my hand.

FRIEDRICH WILHELM GUTHKE.